(12) United States Patent
Harada et al.

(10) Patent No.: US 10,469,015 B2
(45) Date of Patent: Nov. 5, 2019

(54) MOTOR CONTROL DEVICE

(71) Applicant: Mitsubishi Electric Corporation, Tokyo (JP)

(72) Inventors: Shingo Harada, Tokyo (JP); Keiichi Enoki, Tokyo (JP); Yasukazu Murata, Hyogo (JP); Masutaka Watanabe, Tokyo (JP); Yoshimasa Nishijima, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/569,288

(22) PCT Filed: Jun. 22, 2015

(86) PCT No.: PCT/JP2015/067825
§ 371 (c)(1),
(2) Date: Oct. 25, 2017

(87) PCT Pub. No.: WO2016/207936
PCT Pub. Date: Dec. 29, 2016

(65) Prior Publication Data
US 2018/0123493 A1    May 3, 2018

(51) Int. Cl.
*H02P 21/22* (2016.01)
*H02P 29/66* (2016.01)
(Continued)

(52) U.S. Cl.
CPC ............ *H02P 21/22* (2016.02); *B60L 15/025* (2013.01); *H02P 21/0089* (2013.01);
(Continued)

(58) Field of Classification Search
CPC combination set(s) only.
See application file for complete search history.

(56) References Cited

U.S. PATENT DOCUMENTS

2008/0007199 A1   1/2008   Kasaoka et al.
2015/0222216 A1*  8/2015   Ogawa ................. B60L 3/12
                                                    318/490
(Continued)

FOREIGN PATENT DOCUMENTS

JP   2002-51595 A    2/2002
JP   2008-005671 A   1/2008

OTHER PUBLICATIONS

International Search Report for PCT/JP2015/067825, dated Sep. 1, 2017 (PCT/ISA/210).
(Continued)

*Primary Examiner* — Bickey Dhakal
*Assistant Examiner* — Zemenay T Truneh
(74) *Attorney, Agent, or Firm* — Sughrue Mion, PLLC; Richard C. Turner

(57) ABSTRACT

A motor control device having a motor temperature sensor for detecting a magnet temperature of the motor, a magnet magnetic flux calculation section that calculates a magnet magnetic flux of the motor corresponding to the magnet temperature of the motor, a current combination candidate calculating section that calculates a d-q axis current combination candidate that minimizes the input current of the inverter within a voltage limit ellipse determined by a value that can be output by a voltage of a power supply of the motor, and a d-q axis current search section that searches the d-q axis current that minimizes the input current of the inverter within the range of the combination candidate of the d-q axis currents when the d-q axis current of the motor moves on a voltage limiting ellipse by automatic weakening flux control.

5 Claims, 10 Drawing Sheets

(51) Int. Cl.
*H02P 21/14* (2016.01)
*H02P 21/00* (2016.01)
*B60L 15/02* (2006.01)
*H02P 6/17* (2016.01)

(52) U.S. Cl.
CPC .......... *H02P 21/141* (2013.01); *H02P 29/662* (2016.11); *B60L 2240/425* (2013.01); *B60L 2240/429* (2013.01); *B60L 2240/529* (2013.01); *H02P 6/17* (2016.02)

(56) References Cited

U.S. PATENT DOCUMENTS

2017/0019050 A1* 1/2017 Miyama ................... H02P 6/17
2018/0123493 A1* 5/2018 Harada ................... H02P 21/22

OTHER PUBLICATIONS

Communication dated Aug. 23, 2019, issued by the State Intellectual Property Office of P.R.C. in corresponding Chinese Application No. 201580081069.4.

* cited by examiner

MOTOR CONTROL DEVICE

CROSS REFERENCE TO RELATED APPLICATIONS

This application is a National Stage of International Application No. PCT/JP2015/067825 filed Jun. 22, 2015, the contents of which are incorporated herein by reference in its entirety.

TECHNICAL FIELD

The invention relates to a motor control device, and more particularly to a motor control device that alleviates a reduction in system efficiency when a weakening magnetic flux control is performed.

BACKGROUND ART

In recent years, hybrid vehicles and electric vehicles have attracted attention as energy saving and environmental conscious vehicles. Hybrid vehicles use motors as power sources in addition to conventional engines, and electric vehicles use motors as power sources.

Both the hybrid vehicle and the electric vehicle convert DC power stored in a battery into AC power by an inverter circuit and supply the power to the motor to run the vehicle.

Hereinafter, the configuration and operation of the control device of a conventional permanent magnet synchronous motor will be described with reference to the drawings. In the respective drawings, the same or corresponding parts will be described with the same reference numerals.

A detailed example of the conventional control device for a permanent magnet synchronous motor is shown in FIG. 9. As shown in FIG. 9, 7 denotes a DC power source, 6 an inverter, 301 a current detector, 4 a motor, 302 a magnetic pole position detector, and 309 an inverter control circuit.

Here, the control circuit 309 finally generates and outputs the gate pulse signals PU*, PV*, PW* for the respective phase switching elements of the inverter upon the input of the torque command value T*, hereinafter, the configuration will be described together with the operation.

In the rotary coordinate system rotating synchronously with the magnetic flux produced by the permanent magnet which is the rotor of the motor 4, the coordinate axis in the magnetic flux direction is defined as the d axis, the d-q axis coordinate system considers the coordinate axis in the direction perpendicular defined as the q axis. First, in the control circuit 309, 307 is a three-phase/two-phase converter that converts the phase current detection values IU, IW of the motor 4 by the current detector 301 using the magnetic pole position signal θ into DC current detection values Id, Iq that are components of the aforesaid d-q axis coordinate system.

On the other hand, 303 is a current command value generation section including a d-q axis current command calculation section for converting the torque command value T* into the d-q axis current command values Id*, Iq*, the d-q axis current command values Id* and Iq*, which are the outputs of the current command value generation section 303, input to the automatic weakening flux control calculating section 308. The calculation result of the automatic weakening flux control calculating section 308 is input to the current control system 304. The calculation of the automatic weakening flux control calculating section will be described later.

In the current control system 304, the deviation between the aforesaid d-q axis current Id, Iq calculated by the coordinate conversion section 307, and the d-q axis current command values Id*, Iq* are input. Further, the current control system 304 calculates the d-q axis voltage command values vd*, vq* by a proportional integral control using the aforesaid input deviation.

In the current control system 304, a non-interference control for canceling interference occurring between the d-q axes is performed.

The d-q axis voltage command values vd*, vq* calculated by the current control system 304 are input to the two-phase/three-phase converter 305 to calculate the three-phase voltage command values vU*, vV*, vW*.

The three-phase voltage command value calculated by the two-phase/three-phase converter 305 is input to the PWM modulator 306, generates the gate pulse signals PU*, PV*, PW*, and inputs them to the inverter 6.

In the case of driving a permanent magnet type synchronous motor, if the attempt is made to rotate at high speed, as the induced voltage becomes higher than the maximum voltage that the inverter can output, and the generator operates, the operation speed is limited. Therefore, a weakening flux control that weakens the magnetic flux by ostensibly allowing a negative d-axis current to flow and enables high-speed operation is used.

As a method of calculating the d-axis current for implementing the weakening flux control, a value that can be output by the power supply voltage is compared with the d-q axis voltage command value, and the deviation is set to 0 so that a method to control the d-q axis voltage command value by feedback control will be performed. In the following, a method of comparing the value that can be output by the power supply voltage with the d-q axis voltage command value and controlling the d-q axis voltage command value to a predetermined value by feedback control is called "automatic weakening flux control".

In FIG. 9, 308 is an automatic weakening flux control calculation unit which compares a value that can be output by a power supply voltage with a d-q axis voltage command value, and a d-q axis current command value for causing the d-q axis voltage command value to follow a predetermined value by feedback control is calculated. The calculated current command value or the input current command value Id*, Iq* is selected based on a predetermined index, and input to the current control system 304.

As an index of the selection of the current command value, for example, the d-q axis voltage command value is compared with the voltage value that can be output by the power supply voltage (a voltage value in a range in which the induced voltage is not higher than the maximum voltage that the inverter can output), in the case where the d-q axis voltage command value is greater than or equal to the output voltage value, the command value calculated by the automatic weakening flux control is selected, otherwise, the input current command values Id*, Iq* are selected.

As a method of calculating the current command value, the center of the voltage limit ellipse (range of voltage to be limited within a range in which the induced voltage is not higher than the maximum voltage that the inverter can output) which can be output by the power supply voltage is calculated from the magnet magnetic flux and the inductance of the motor, there is a method of correcting the current command value in the center direction of the voltage limit ellipse (Patent Document 1).

However, with this method, when the motor temperature changes from the designed value, since the characteristics of the motor change, when the current command value is corrected, the combination of the d-q axis currents is not optimal with respect to the torque and the number of revolutions, there is a problem that the efficiency of the motor decreases and the efficiency of the combined motor and inverter decreases.

FIG. 10 is a diagram showing the task of the weakening flux control that corrects the current command value in the direction of the center of the voltage limit ellipse when the temperature of the motor lowers. In FIG. 10, 801 is a voltage limit ellipse calculated by the magnetic flux of the motor at the actual motor temperature, 802 is the center point of the voltage limit ellipse calculated by the magnetic flux of the motor at the aforesaid actual motor temperature, 803 is a voltage limit ellipse calculated by the magnetic flux of the motor at the motor temperature of the design value, and 804 is a center point of the voltage limit ellipse calculated by the magnet magnetic flux of the motor at the aforesaid designed motor temperature. The center point of the voltage limit ellipse on the d-q axis moves in the negative direction on the d axis when the magnetic flux of magnet of the motor increases, and moves in the positive direction on the d axis when it decreases. Further, in general, the magnetic flux of the magnet increases as the temperature decreases, and decreases as the temperature increases. Therefore, when the motor temperature decreases, the center point of the voltage limit ellipse moves in the negative direction on the d axis and when the motor temperature increases, the center point of the voltage limit ellipse moves in the positive direction on the d axis. In a conventional device, when the current vector 805 is input as the command value at the beginning, the current vector is corrected toward the point 804 by the automatic weakening flux control, stopped at the intersection point 807 with the voltage limit ellipse 801, and finally, the current vector becomes 806. On the other hand, the maximum system efficiency curve MXSEC determined by the torque and the number of revolutions of a certain motor is generally close to the maximum motor efficiency curve because the inverter efficiency is higher than the motor efficiency. Since the maximum motor efficiency curve MXSEC moves on the d axis in the same direction as the movement direction of the voltage limit ellipse, when the motor temperature decreases, the maximum system efficiency curve MXSEC moves in the negative d axis direction. Therefore, when the motor temperature decreases, since the deviation between the final current vector 806 and the maximum system efficiency curve MXSEC becomes large, the system efficiency decreases in the automatic weakening flux control of the Document 1.

Further, for example, a permanent magnet type synchronous motor, a winding type synchronous motor, as well as an induction machine can be used as the motor 4.

PATENT LITERATURE

JP2008-005671 A

DISCLOSURE OF INVENTION

Technical Problem

In a conventional automatic weakening flux control, when the center of the voltage limit ellipse moves due to a change in the magnetic flux of the magnet of the motor in accordance with a change in the motor temperature, it becomes impossible to correct to an appropriate current command value, there is a problem that the system efficiency of the drive system including the motor and the inverter that becomes the motor drive power source deteriorates.

Solution to Problem

A motor control device according to the present invention is for controlling a motor in a vehicle having an inverter including arms of a plurality of phases having a plurality of switching elements and the motor of a plurality of phases driven by the inverter, and has a motor temperature sensor for detecting a magnet temperature of the motor, a magnet magnetic flux calculation section that calculates a magnet magnetic flux of the motor corresponding to the magnet temperature of the motor, a current combination candidate calculating section that calculates a d-q axis current combination candidate that minimizes the input current of the inverter within a voltage limit ellipse determined by a value that can be output by a voltage of a power supply of the motor, and a d-q axis current search section that searches the d-q axis current that minimizes the input current of the inverter within the range of the combination candidate of the d-q axis currents when the d-q axis current of the motor moves on a voltage limiting ellipse by automatic weakening flux control, and it becomes possible to improve the robustness of motor control and to alleviate a reduction in system efficiency of a drive system including a motor and an inverter.

Advantageous Effect of Invention

FIG. 8 is a graph showing the effect of the present invention when the motor temperature decreases. According to the present invention, during automatic weakening flux control, the current motor temperature is detected, the magnet flux of the motor corresponding to the motor temperature is calculated by the magnet flux calculating section, by updating the center point of the voltage limit ellipse using the calculated magnet magnetic flux of the motor, an appropriate voltage limit ellipse 801 and a center point 802 of an appropriate voltage limit ellipse can be obtained. Therefore, when the current vector 805 is input as the command value at the beginning, the current vector is corrected towards the point 802 and reaches the intersection point 901 with the voltage limiting ellipse 801 according to the automatic weakening flux control. Further, the robustness of the automatic weakening flux control against the temperature change of the motor is improved. Further, when the d-q axis current command value reaches the point 901, a constant torque curve at the intersection point 901 is calculated as a combination candidate of the d-q axis current which minimizes the input current of the inverter, the d axis coordinate of the point 901 is compared with the d axis coordinate of the point 802, when the d axis coordinate of the point 901 is large, it is arranged in the negative d axis direction, when the d axis coordinate of the point 901 is small, a d-q axis current that minimizes the input current of the inverter within the combination candidate of the d-q axis current is searched in the positive d axis direction, by correcting the current command value at the point 903 where the efficiency becomes the maximum, it is possible to alleviate a decrease in system efficiency comprising the motor and the inverter according to the automatic weakening flux control. In addition, even when the motor temperature rises, the same effect can be obtained by the present invention.

DESCRIPTION OF EMBODIMENTS

First Embodiment

Figure 1:
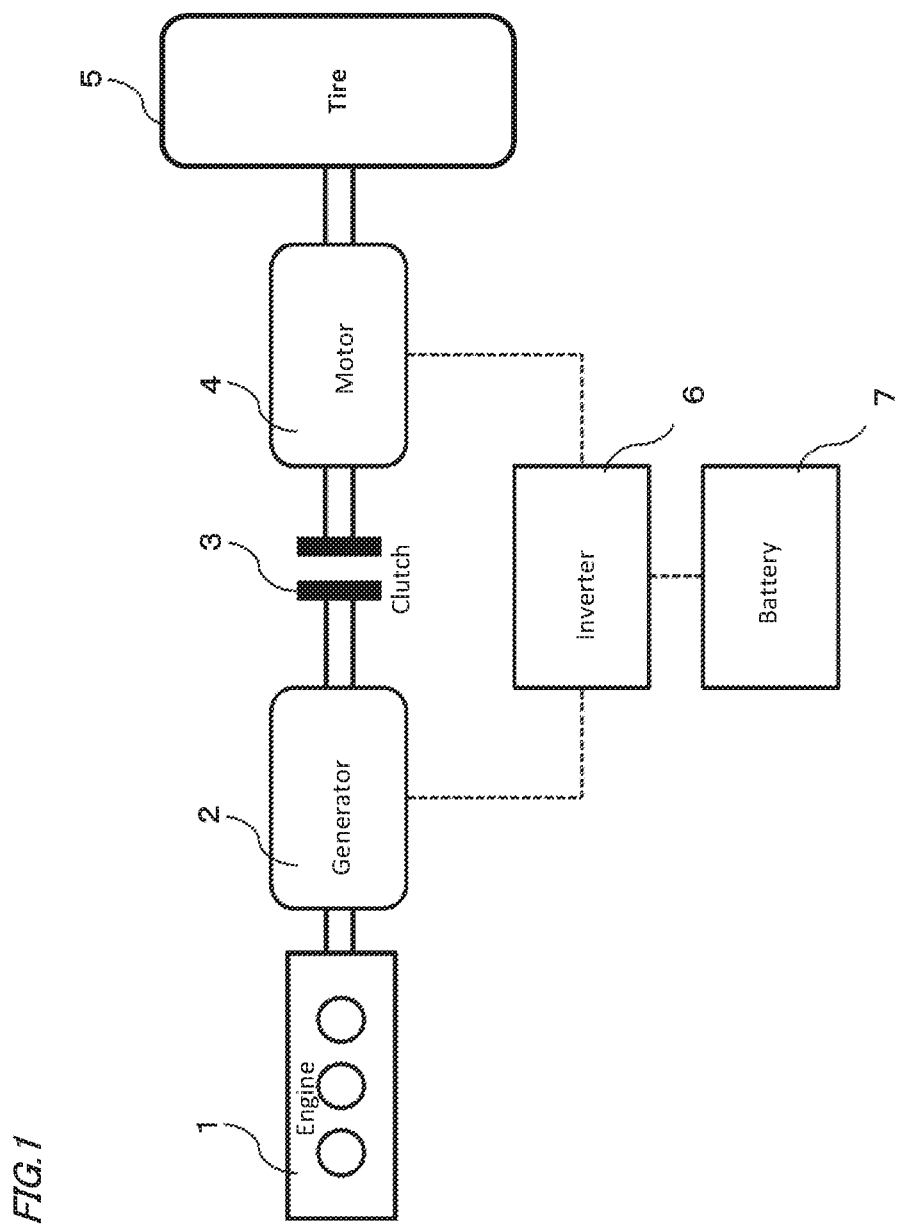
FIG. 1 is a schematic configuration diagram showing a vehicle according to a first embodiment of the present invention.

Hereinafter, a preferred embodiment 1 of a motor control device according to the present invention will be described with reference to FIGS. 1 to 8. In the respective drawings, the same or corresponding parts will be described with the same reference numerals.

FIG. 1 is a schematic configuration diagram showing a vehicle in which a motor control device is mounted according to a first embodiment of the present invention. In FIG. 1, a hybrid vehicle including the engine 1 and the motor 4 is described as an example, but the present embodiment is also applicable to an electric vehicle. In FIG. 1, a generator 2 is driven by an engine 1, so that a generator 2 generates electric power, and the generated electric power is charged into a battery 7 via an inverter 6.

Then, the motor 4 is driven by supplying electric power generated by the generator 2 or electric power stored in the battery 7 to the motor 4. The motor 4 drives the tire 5 to run the vehicle. When supplying the electric power stored in the battery 7 to the motor 4, the DC power stored in the battery 7 is converted into AC power by the inverter 6 and is supplied to the motor 4.

When the vehicle decelerates, the motor 4 is rotated by the tire 5, the motor 4 performs a regenerative power generation, and the electric power generated therein is charged in the battery 7 via the inverter 6.

Also, the inverter 6 converts DC power stored in the battery 7 into AC power, drives the generator 2, and starts the engine 1.

Further, according to the coupling of the clutch 3, by transmitting the driving force of the engine 1 to the tire 5 via the motor 4, the vehicle can be driven.

In the first embodiment to be described later, the aforesaid series type hybrid vehicle will be described as an example, but a parallel type hybrid vehicle may be used.

Further, as described above, the generator 2 and the motor 4 may be a motor/generator combining driving and power generation.

Although is it explained that the vehicle owns one battery and one inverter, the vehicle may provide a plurality of batteries of different voltages, and may own a DC/DC convertor that performs voltage conversion between the inverter and the generator, as well as between the inverter and the battery.

Figure 2:
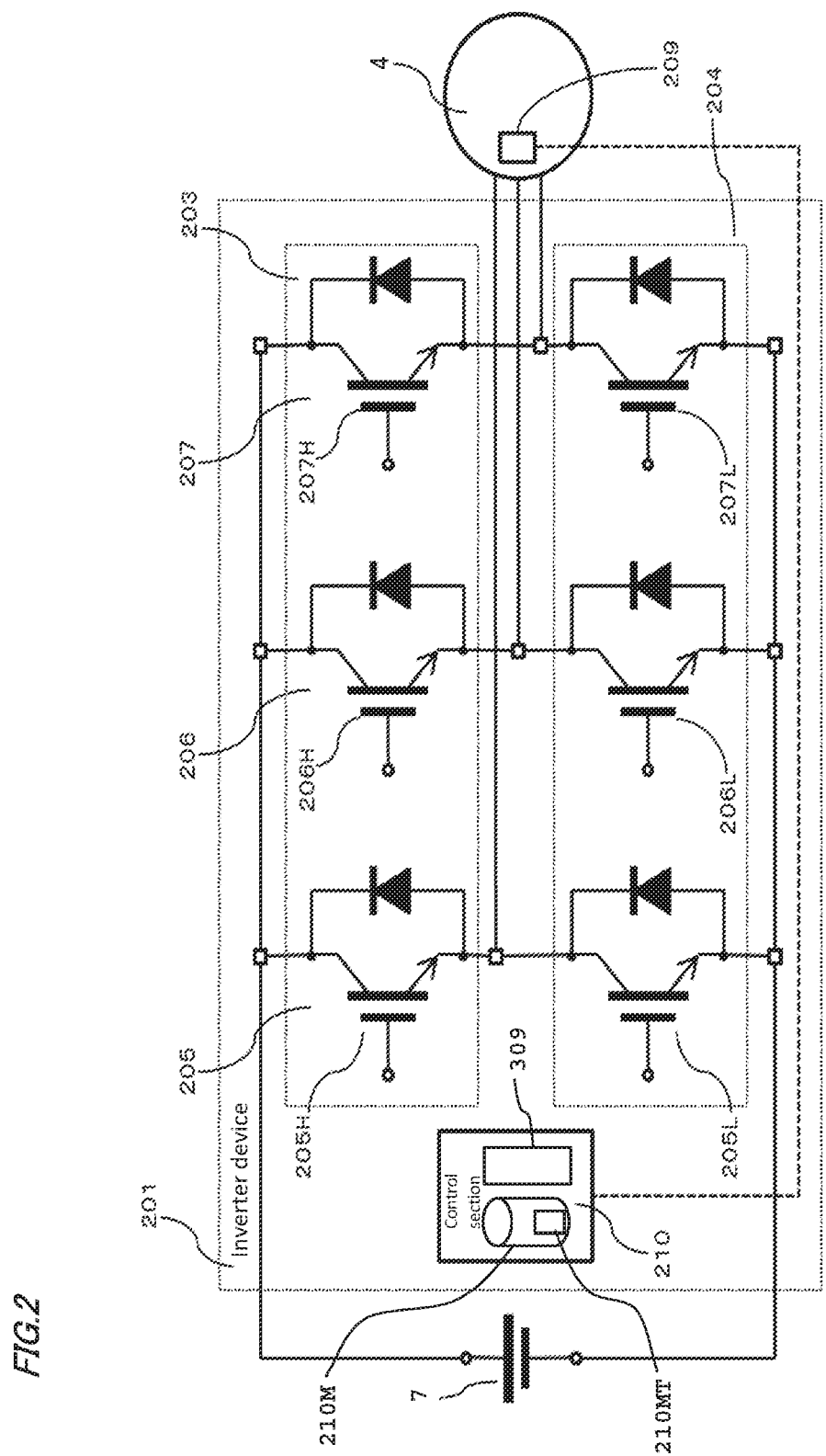
FIG. 2 is a schematic configuration diagram showing a representative case of a motor control device according to the embodiment 1 of the present invention.

FIG. 2 is a schematic configuration diagram showing the motor control device according to the first embodiment of the present invention. As shown in FIG. 2, the motor control device includes a motor 4, a battery 7, and an inverter 201. The inverter 201 converts DC power stored in the battery 7 into AC power to drive and control the motor 4.

The inverter 201 includes a U-phase switching circuit 205, a V-phase switching circuit 206, and a W-phase switching circuit 207.

The U-phase switching circuit 205 is composed of an upper arm side switching element 205H provided on the upper arm 203 side (high voltage side), and a lower arm side switching element 205L provided on the lower arm 204 side (low voltage side).

The upper arm side switching element 205H and the lower arm side switching element 205L are connected in series to each other.

In addition, a freewheeling diode is connected in reversely parallel to the upper arm side switching element 205H and the lower arm side switching element 205L, respectively.

In addition, the V-phase switching circuit 206 is composed of an upper arm side switching element 206H provided on the upper arm 203 side, and a lower arm side switching element 206L provided on the lower arm 204 side. The upper arm side switching element 206H and the lower arm side switching element 206L are connected in series to each other.

In addition, a freewheeling diode is connected in reversely parallel to the upper arm side switching element 206H and the lower arm side switching element 206L, respectively.

Further, the W-phase switching circuit 207 is composed of an upper arm side switching element 207H provided on the upper arm 203 side, and a lower arm side switching element 207L provided on the lower arm 204 side. The upper arm side switching element 207H and the lower arm side switching element 207L are connected in series to each other. In addition, a freewheeling diode is connected in reversely parallel to the upper arm side switching element 207H and the lower arm side switching element 207L, respectively.

IGBTs (Insulated Gate Bipolar Transistors) as well as FETs (Field Effect Transistors), for example, can be used as the switching elements 205H to 207H and 205L to 207L of the switching circuits 205 to 207.

Further, the motor 4 provides a temperature sensor 209 for measuring the temperature of the motor 4.

Figure 3:
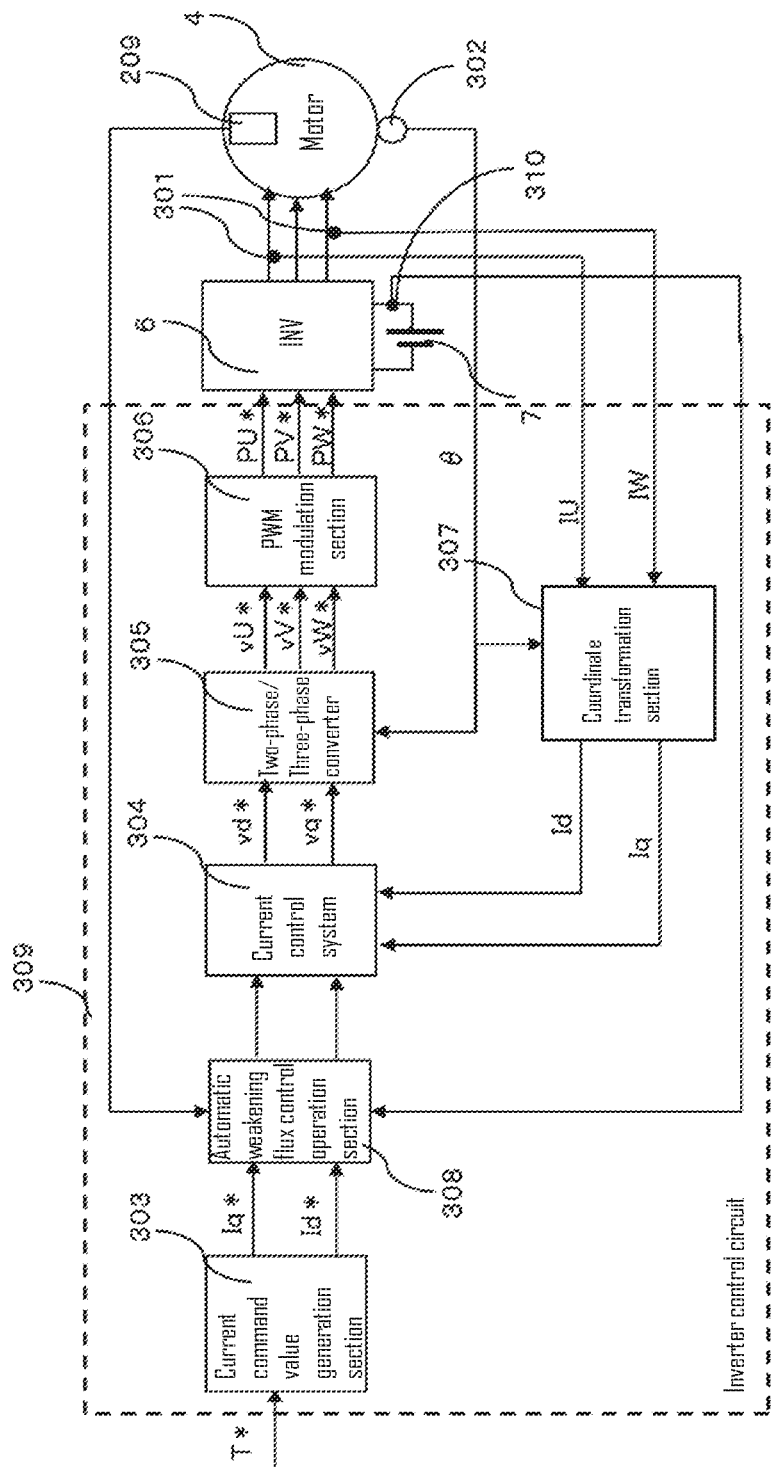
FIG. 3 is a diagram showing an example of a functional configuration of a main part of a motor control device according to the embodiment 1 of the present invention.

In addition, FIG. 2 and 3 show a case where the a motor temperature sensor 209 is provided in the motor 4, when the estimated value of the motor temperature is used instead of the motor temperature measured by the motor temperature sensor 209, the motor temperature sensor 209 may not be provided.

Further, the control unit 210 is provided by the U-phase switching circuit 205, the V-phase switching circuit 206, and the W-phase switching circuit 207. The control section 210 includes an arithmetic unit, a storage unit, and an input/output unit, and drives and controls the switching elements 205H to 207H and 205L to 207L.

Further, the control unit 210 acquires the motor temperature (temperature information) of the motor provided with the temperature sensor, based on the sensor signal from the temperature sensor 209.

In addition, in FIG. 2, the control unit 210 is disposed inside the inverter 201, but it may be arranged outside the inverter 201.

Figure 4A:
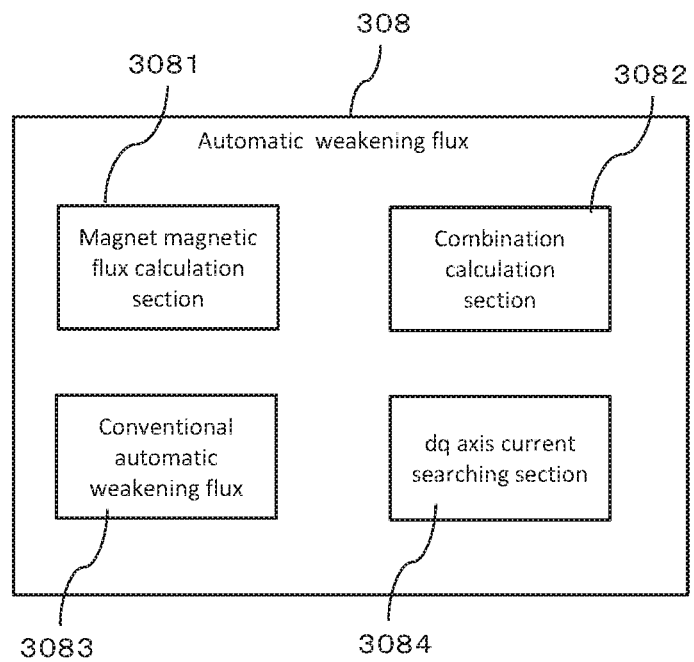
FIG. 4A is a view exemplifying a functional configuration inside the automatic weakening flux control operation unit 308 in the motor control device of FIG. 3.

FIG. 3 is a diagram showing an example of a functional configuration of a main part of the motor control device according to the first embodiment of the present invention. Further, FIG. 4A is a diagram exemplifying a functional configuration inside the automatic weakening flux control operation section 308 in the motor control device in FIG. 3.

Figure 9:
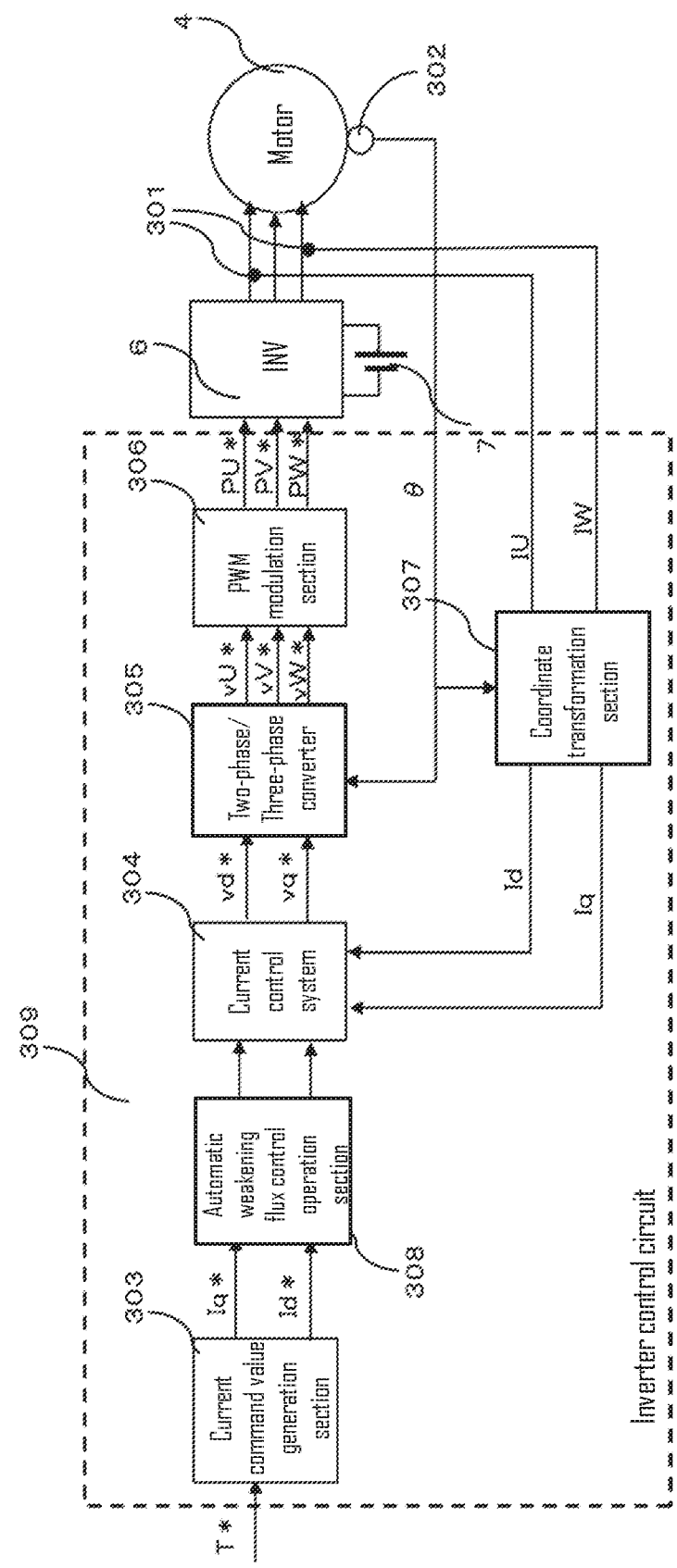
FIG. 9 is a block diagram showing a functional configuration of a main part of a conventional motor control device.
Figure 10:
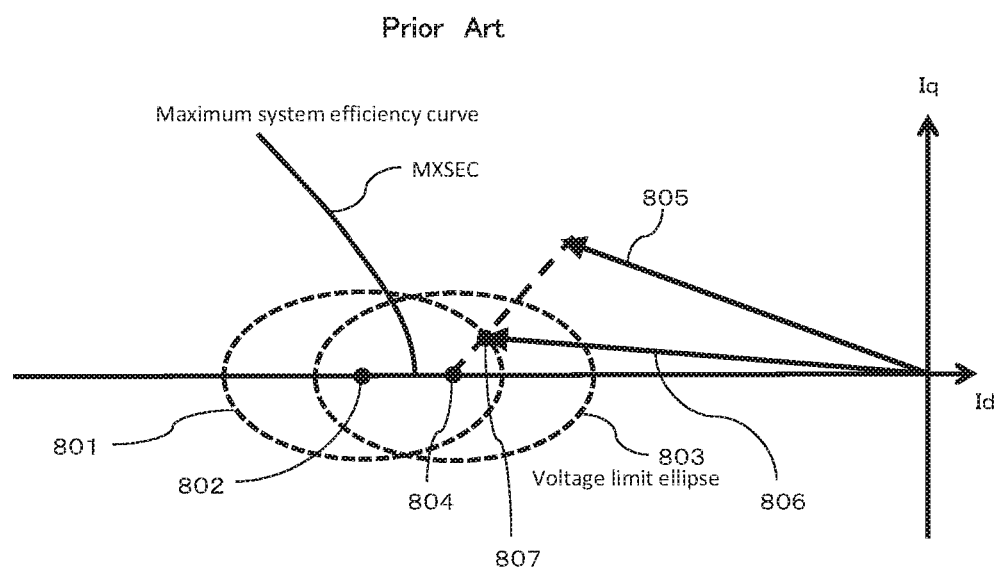
FIG. 10 is a figure showing the problem of a conventional device.

The difference between FIG. 9 and FIG. 3 is that a motor temperature sensor 209 and a current sensor 310 are added. In FIG. 3, the current command value generation section 303, the current control system 304, the two-phase/three-phase conversion section 305, the PWM modulation section 306, and the coordinate conversion section 307 have the same functions than the current command value generating section 303, the current control system 304, the two-phase/three-phase conversion section 305, the PWM modulation section 306, and the coordinate conversion unit 307 in FIG. 9, the description of the current command value generation section 303, the current control system 304, the two-phase/three-phase conversion section 305, the PWM modulation section 306 and the coordinate conversion section 307 will be omitted.

The motor temperature sensor 209 measures the magnet temperature of the motor and sets it as the magnet temperature estimated value of the motor, and the current sensor 310 measures the input current of the inverter 6. Sensor information acquired by the motor temperature sensor 209 and the current sensor 310 are used in the automatic weakening magnetic flux control calculation unit 308.

The magnet temperature estimated value of the motor is performed by using at least one of the magnet temperature of the motor 4, the motor current, and the motor voltage. In addition, the motor current is either the phase current of the motor, the line current or the d-q axis current, and the motor voltage is either the phase voltage, the line voltage or the d-q axis voltage of the motor.

FIG. 4A is a diagram showing an example of a functional configuration inside the automatic weakening flux control operation section 308 in FIG. 3. In FIG. 4A, the conventional automatic weakening flux calculation section 3083 is equivalent to the processing of the automatic weakening flux control operation section 308 in the conventional device of FIG. 9. In FIG. 4A, a magnet magnetic flux calculation section 3081 for calculating a corresponding magnetic flux of the motor from the detected motor temperature, a current combination candidate calculating section 3082 for calculating combination candidate of d-q axis current command values for minimizing the inverter input current after performing the automatic weakening flux control, and a d-q axis current searching section 3084 for searching a d-q axis current command value that minimizes the inverter input current according by the aforesaid combination candidate, are added to the conventional automatic weakening flux control operation section 3083 (automatic weakening flux control operation section 308 in the conventional device in FIG. 9).

Figure 4B:
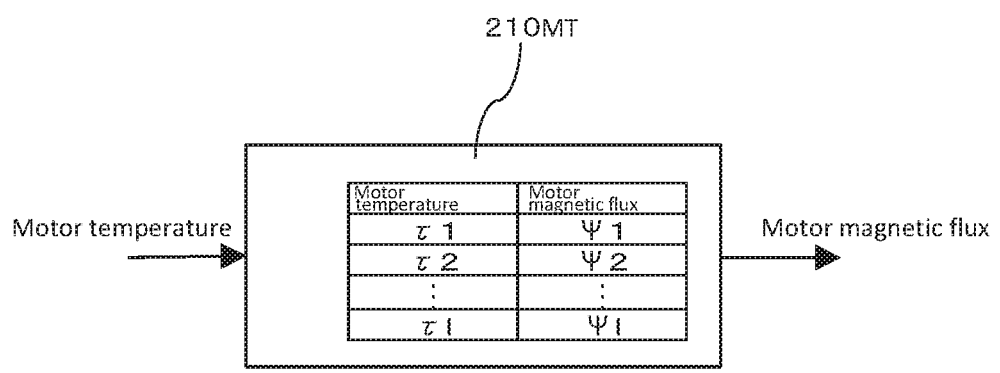
FIG. 4B is a diagram showing an example of a configuration of a magnetic flux table 210 MT in FIG. 2.

FIG. 4B is a diagram showing an example of the configuration of the magnetic flux table 210MT in FIG. 2. In FIG. 4B, the case where the number of pairs of the motor temperature and the corresponding motor magnetic flux is 1 is illustrated. Here, l is a positive integer.

Figure 5:
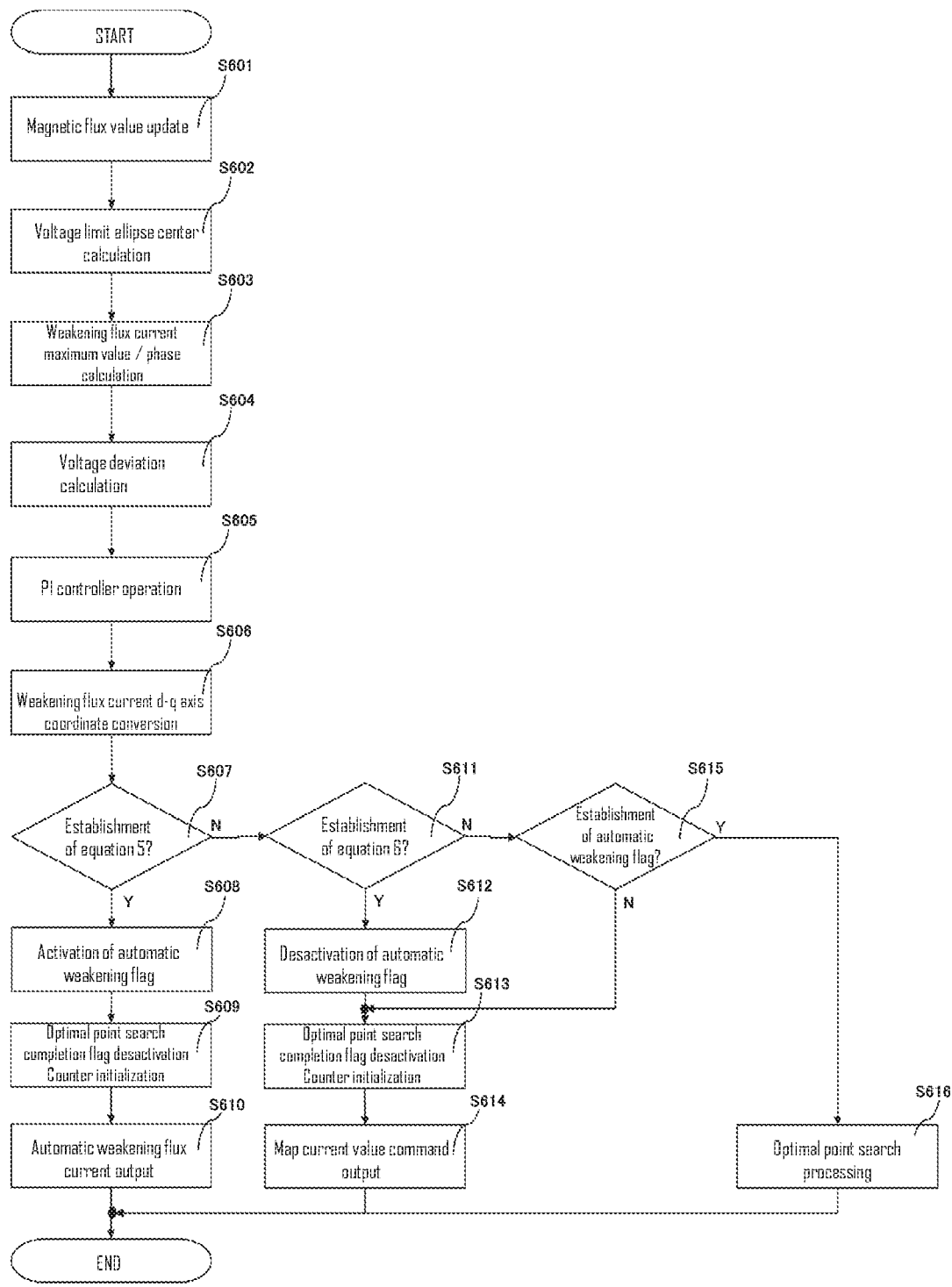
FIG. 5 is a flowchart showing an example of processing contents and a processing procedure of automatic weakening flux control with an optimal point searching function of the motor control device according to the first embodiment of the present invention.

FIG. 5 is a flowchart showing an example of the processing contents and the processing procedure of automatic weakening flux control with optimal point searching function in this embodiment. FIG. 5 shows the calculation processing when the calculation step is at the number of times n. Here, n is an integer. Hereinafter, with reference to the flowchart of FIG. 5, an example of the processing content and processing procedure of the automatic weakening flux control operation section 308 will be described in detail.

Each processing of processing steps S601 to S616 in the processing flow exemplified in FIG. 5 is performed according to arrows between respective steps in FIG. 5, Y (yes), and N (no) in the determination processing step. Hereinafter, the processing contents in each of the processing steps S601 to S616 will be described in accordance with arrows, Y and N in FIG. 5.

In step S601, the magnetic flux table 210MT is referred by the motor temperature acquired from the motor temperature sensor 209, and the magnetic flux value is updated.

The magnetic flux table 210MT is stored in the storage device 210M of the control unit 210 as illustrated in FIG. 2. As illustrated in FIG. 4B, the magnetic flux table 210MT includes a motor temperature τ and a motor magnetic flux Ψ corresponding to the motor temperature. When the motor temperature is input, the magnetic flux table 210 MT outputs a motor magnetic flux corresponding to the input motor temperature. By appropriately updating the value of the motor magnetic flux corresponding to the outputted motor temperature, even when the motor magnetic flux changes due to the temperature change, it is possible to appropriately correct the d-q axis current command value in the automatic weakening flux control. Therefore, it is possible to improve the robustness of motor control and alleviate the reduction in system efficiency.

In step S602, the center point I dM of the voltage limit ellipse is calculated based on the updated motor magnetic flux value. The calculation is performed according to the equation 1.

$$IdM = -\Psi/Ld \qquad \text{(Equation 1)}$$

Here, Ψ is the motor magnetic flux acquired in step S601, and Ld is the d-axis inductance.

In step S603, the maximum value/phase of the −weakening flux current is calculated. The calculation is performed according to Equations 2-1 and 2-2.

$$\theta = \arctan(Iq^*/(Id^*-IdM)) \qquad \text{(Equation 2-1)}$$

$$IFW\max = \sqrt{(Iq^{*2}+(Id^*-IdM)^2)} \qquad \text{(Equation 2-2)}$$

Here, θ is the phase of the weakening flux current, and IFWmax is the maximum value of the weakening flux current In step S604, the voltage deviation Ev is calculated. The calculation is performed according to Equations 3-1 and 3-2.

$$Ev = Vpn \times \sqrt{(1/2)} \times k - Vrms \qquad \text{(Equation 3-1)}$$

$$Vrms = \sqrt{(vd^{*2}+vq^{*2})} \qquad \text{(Equation 3-2)}$$

Here, Ev is the difference (voltage deviation) between the upper limit value (Vpn×√(½)×k) of the voltage that the power supply voltage can output and the line voltage effective value Vrms of the motor, K is the margin of the voltage margin, the value of k is determined by adjusting from experiments.

Further, Vpn is a power supply voltage, vd*, and vq* are d-q axis voltage command values.

In step S605, the calculation result of step S604 is input to the PI controller, and the output of the PI controller is calculated. To this PI controller, a limiter with a lower limit of 0 is provided so that the output does not become negative. An anti-windup function may be added to the integrator.

In step S606, the d-q axis current command values IdFW* and IqFW* are calculated using the output of the PI controller. The calculation is performed according to equations 4-1 and 4-2.

$$IdFW^* = IFW \times \cos\theta + I\,dM \quad \text{(Equation 4-1)}$$

$$IqFW^* = IFW \times \sin\theta \quad \text{(Equation 4-2)}$$

Here, IFW is the output value of the PI controller.

In step S607, it is determined whether the current operating point is outside the voltage limit ellipse taking the margin into account. The determination is made according to equation 5.

$$Ev - Vrms < Evth \quad \text{(Equation 5)}$$

Here, Evth is a threshold value for determining whether the current operating point is outside the voltage limit ellipse, and is adjusted and determined by experiment.

In step S608, the automatic weakening flag is enabled. The automatic weakening flag is a variable indicating whether the automatic-weakening flux control is effective, it is valid if it is 1, and not valid if it is 0. The initial value of the automatic weakening flag after activation is 0.

In step S609, the optimum point search flag is invalidated. Also, the counter as well as N used in the optimum point search processing S616 are initialized. N will be described later. The optimum point search flag is a variable indicating whether or not the optimum point search is valid, it is valid if it is 1, and not valid if it is 0.

In step S610, the d-q axis current command values IdFW* and IqFW* calculated in step S606 are selected as the output current to the current control system.

In step S611, the d-q axis current command values Id*, Iq* input to the automatic weakening flux control calculation unit 308 due to the change in the torque command value T* input to the current command value generation unit 303 change or not. The judgment is made according to equation 6.

$$|Id^*(n) - Id^*(n-1)| > Ad$$

or $$|Iq^*(n) - Iq^*(n-1)| > Aq \quad \text{(Equation 6)}$$

Here, (n) indicates the value of the operation n step. In addition, Ad and Aq are threshold values for judging that the current command value has changed, and are determined by adjusting experiment.

In step S612, the automatic weakening flag is invalidated.

In step S613, the optimum point search flag is invalidated. Also, the counter and N used in the optimum point search processing are initialized.

In step S614, as the output current to the current control system, the d-q axis current command values Id* and Iq* input to the automatic weakening flux control unit 308 are selected.

In step S615, it is determined whether the automatic weakening flag is established. When established, it continues to the optimum point searching process S616. When not established, as there is no need to perform the optimum point searching process, it continues to step S613.

In step S616, a combination of d-q axes current which maximizes the system efficiency under a given condition is found by search. Specific processing will be described later.

Further, in the first embodiment, the magnet temperature of the motor is acquired, but even if the rotor temperature of the motor is acquired by the temperature sensor, the same effect can be obtained.

Further, even if the magnet temperature of the motor is calculated by estimation, the same effect can be obtained. The estimation is carried out by, for example, measuring the magnet temperature of the motor in advance with respect to the operating condition of the motor, storing it in the map, and reading the map in accordance with the current operating condition of the motor.

Figure 6:
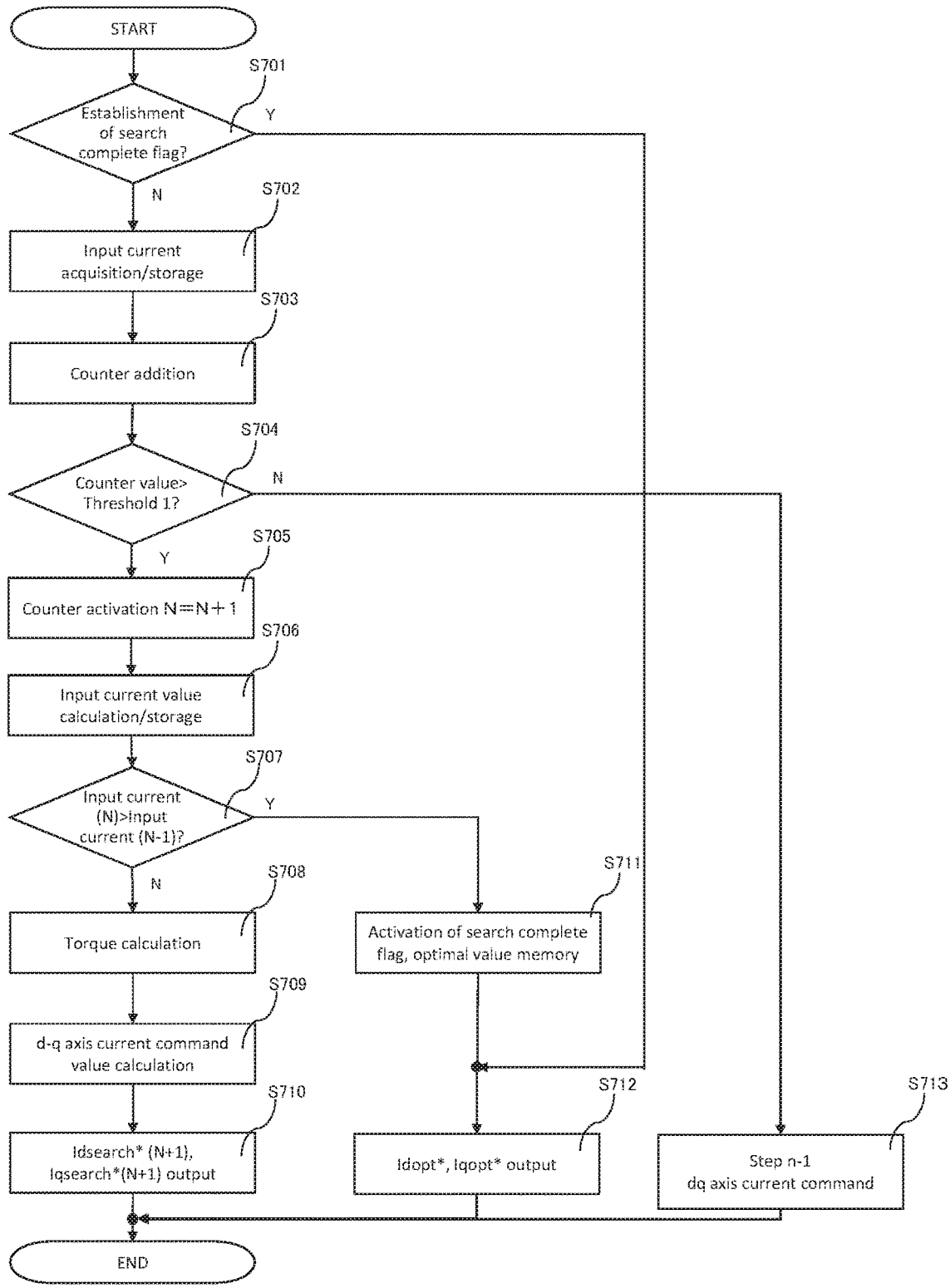
FIG. 6 is a flowchart showing an example of a process of the optimum point search control in FIG. 5 of the motor control device according to the first embodiment of the present invention.

FIG. 6 is a flowchart showing an example of the process of the optimum point search control in FIG. 5. FIG. 6 shows the calculation processing at the number of times n of calculation step.

Hereinafter, with reference to the flowchart of FIG. 6, an example of the processing content and processing procedure of the optimum point search control will be described in detail.

Each processing of processing steps S701 to S713 in the processing flow exemplified in FIG. 6 is performed according to arrows between respective steps in FIG. 6, Y (yes), and N (no) in the determination processing step. Processing contents in each of the processing steps S701 to S713 will be described below in accordance with the arrows, Y and N in FIG. 6.

In step S701, it is determined whether the search completion flag of the optimal point search control is established. When established, the search process is not performed and the process continues to step S712.

In step S702, the inverter input current Idc (n) is acquired from the detection value of the current sensor 310 and stored in the memory.

In step S703, counters are added.

In step S704, it is determined whether the counter value is larger than the threshold value 1. Here, the threshold value 1 is set to a value that can sufficiently remove the influence of measurement noise.

In step S705, the counter is initialized. Also 1 is added to the inverter input current value calculation count N. N is an integer, and its initial value is 0.

In step S706, the inverter input current value Idcave (N) is calculated and stored. The inverter input current value Idcave (N) is calculated using the inverter input current Idc stored in step S702. For example, the inverter input current value Idcave (N) becomes the arithmetic average value of all the Idc stored in the step from the initial value to the time when the counter becomes larger than the threshold value 1. The calculated inverter input current value Idcave (N) is stored in the memory.

In step S707, it is determined whether the calculated inverter input current value Idcave (N) is larger than the immediately preceding value Idcave (N−1). However, if N=1, the process proceeds to step S708.

In step S708, a combination candidate of the d-q axis current that minimizes the input current of the inverter is calculated. Here, as an example, we calculate a combination candidate of d-q axis currents that is equal to the torque before searching. Based on the current d-q axis current command values Id* and Iq*, the torque estimation value test is calculated by the equation 7.

$$Test = Pn \times (Ld - Lq) \times Id^* \times Iq^* \quad \text{(Equation 7)}$$

Here, Pn is the number of pole pairs of the motor, and Lq is the q-axis inductance.

In step S709, the current command values Idsearch*, Iqsearch* minutely changed on the d-q axes are calculated by equations 8-1 and 8-2. The change amount ΔIq of the q-axis when the d-axis current is changed by ΔId is calculated by equation 8-3. Equation 8-3 means the slope of the constant torque curve in the d-q coordinate system. The change direction is determined by comparing the value IdM of the d-axis coordinate at the center of the voltage limit ellipse with IdFW* of the step immediately before the optimum point search process S616 is performed. When the immediately before IdFW* is smaller than IdM, since the optimum point is in the positive d-axis direction, ΔId becoms positive and the immediately preceding IdFW* is larger than IdM, since the optimum point is in the negative d-axis direction, ΔId becomes negative. Also, the initial values Idsearch* (1) and Iqsearch* (1) are the values immediately before the d-q axis current command value input to the current control system 304.

$$Idsearch(N+1)=Idsearch*(N)+\Delta Id \quad \text{(Equation 8-1)}$$

$$Iqsearch*(N+1)=Iqsearch*(N)+\Delta Iq \quad \text{(Equation 8-2)}$$

$$\Delta Iq = Test \times (Ld-Lq)/(Pn \times (\Psi+(Ld-Lq) \times Idsearch*(N))^2 \times \Delta Id \quad \text{(Equation 8-3)}$$

In step S710, the updated d-q axis current command value Idsearch* (N+1), Iqsearch* (N+1) is selected as the output current to the current control system.

In step S711, it is determined that the search is completed, and the completion flag of the optimum point search is validated.

Further, the optimum values Idopt* and Iqopt* of the d-q axis current command value are determined and stored by equations 8-4 and 8-5.

When the search is completed at the Nth time, since the result of the number of times (N−1) is optimal, the search value of the number of times (N−1) is adopted as shown in equations 8-4 and 8-5.

$$Idopt*=Idsearch*(N-1) \quad \text{(Equation 8-4)}$$

$$Iqopt*=Iqsearch*(N-1) \quad \text{(Equation 8-5)}$$

In step S712, optimum d-q axis current command values Idopt* and Iqopt* are selected as output currents to the current control system.

In step S713, it is determined that the d-q axis current command value is not changed, and the d-q axis current command value calculated in the number of time n−1 step is selected as the output current to the current control system. When n=1, it outputs the immediately preceding d-q axis current command value.

In step S702, the inverter input current is acquired by the current sensor. However, it is also possible to obtain the inverter input current by using the phase current detection values IU and IW of the motor and the three-phase voltage command values vU*, vV*, vW* and the power supply voltage Vpn, The same effect can be obtained also for the input current estimated value. The estimation of the inverter input current Idcest is performed, for example, according to equation 9-1.

$$Idcest=(IU \times vU*+Iv \times vV*+IW \times vW*)/Vpn \quad \text{(Equation 9-1)}$$

$$IV=-IU-IW \quad \text{(Equation 9-2)}$$

Here, IV is a v-phase phase current, IU is a u-phase phase current, and IW is a w-phase phase current.

In addition, when the inverter input current estimated value is used, the current sensor 310 in FIG. 3 can be omitted.

Figure 7:
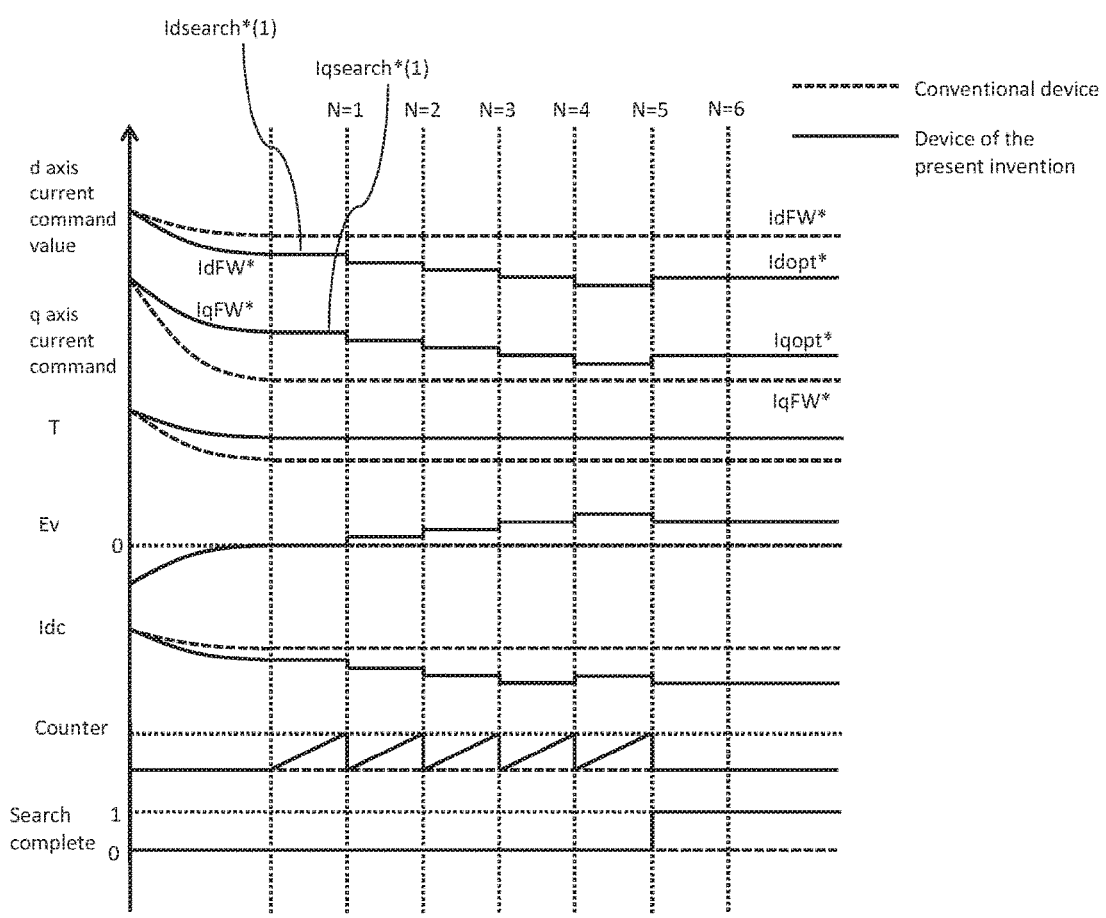
FIG. 7 is a time chart showing the optimum point search control in FIG. 5 in the case where the motor temperature decreases in the first embodiment 1 of the present invention.

FIG. 7 is a time chart of the optimum point search control in FIG. 5 when the motor temperature decreases in the first embodiment of the present invention. However, FIG. 7 shows an example in which the search is completed in the step of N=5. FIG. 7 is illustrated as compared with the control of the conventional device, and is shown by a solid line in the case of the control of the device of the present invention and by a dotted line in the case of the control of the conventional device. In FIG. 7, the d-axis current command value indicates the d-axis current command value input to the current control system 304, and the q-axis current command value indicates the q-axis current command value input to the current control system 304. The changes in the d-axis current command value, the q-axis current command value, the motor torque T, the voltage deviation Ev, and the inverter input current Idc in FIG. 7 are the same as those in FIG. 8. However, in FIG. 7, measurement noise included in the inverter input current Idc are not shown.

Figure 8:
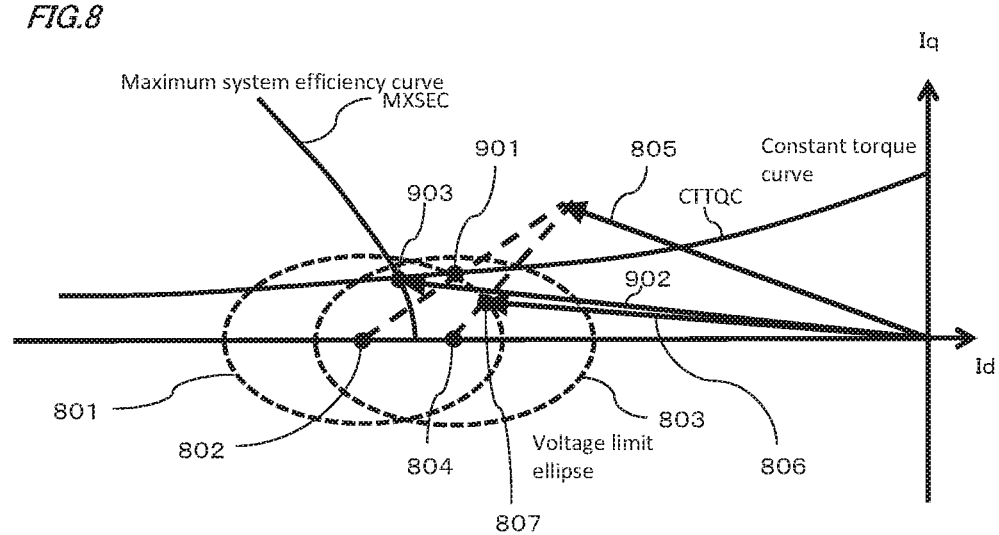
FIG. 8 is a graph showing the effect of the first embodiment of the present invention in a case where the motor temperature decreases.

In FIG. 7, when the current command value outside the voltage limiting ellipse is input, since there is no optimal point search control in the conventional apparatus, the d-q axis current command value is output such that the voltage deviation Ev follows 0 by the automatic weakening flux control (the d-q axis current command value approaches the point 807 in FIG. 8).

On the other hand, in the device of the present invention, when the equation (5) is no longer established during the automatic weakening flux control, the optimum point search control is started. Under the initial condition, since the search completion flag is 0, the input current acquisition point storage S702 and counter addition S703 in FIG. 7 are performed. When the counter value is equal to or less than the threshold value 1, the d-q axis current command value of the n−1 step is selected as the d-q axis current command value output.

When the counter value becomes larger than the threshold value 1, the counter is initialized and the inverter input current value Idcave (N) is calculated. If the condition is not satisfied in step S707, the d-q axis current command value is updated by the equations 8-1, 8-2, and 8-3 in step S709, and the value is output.

Thereafter, the above process is repeated until the judgment is satisfied in step S707. When the judgment in step S707 is satisfied, the search completion flag is enabled, and the optimum values of d-q axis current command values Idopt*, Iqopt* are selected.

According to the first embodiment, in FIG. 7, after the automatic weakening flux control, by correcting the d-q axis current command value so as to minimize the inverter input current Idc, it becomes possible to alleviate the problem of efficiency reduction.

FIG. 8 is a diagram showing the effect of the first embodiment of the present invention when the motor temperature decreases. According to the first embodiment of the present invention, when the automatic weakening flux control is executed, the current motor temperature is detected, the aforesaid magnetic flux calculation unit for calculating a magnet magnetic flux of the motor corresponding to the aforesaid motor temperature, by updating the center point of the voltage limit ellipse using the calculated magnet magnetic flux of the motor, an appropriate voltage limit ellipse 801 and a center point 802 of an appropriate voltage limit ellipse can be obtained. Therefore, when the current vector 805 is input as the command value at the beginning, by the automatic weakening flux control, the current vector is corrected toward the center point 802 of the appropriate voltage limit ellipse 801 corresponding to the change in the motor temperature, and reaches the intersection point 901 with the appropriate voltage limiting ellipse 801.

Further, the robustness of the automatic weakening flux control against the temperature change of the motor is improved.

Further, when a d-q axis current command value reaches a point 901, a constant torque curve at the torque at the point 901 is calculated as a combination candidate of the d-q axis current that minimizes the input current of the inverter, the d-axis coordinate of the point 901 is compared with the d-axis coordinate of the point 802, when the d-axis coordinate of the point 901 is large, it is arranged in the negative d-axis direction, when the d-axis coordinate of the point 901 is small, it is arranged in the positive d-axis direction within the d-q axis current combination candidate, the aforesaid d-q axis current that minimizes the input current of the inverter is searched, by correcting the current command value at the point 903 where the system efficiency is maximized, it is possible to alleviate a reduction in the system efficiency of the drive system including the motor and the inverter by automatic weakening flux control.

In the first embodiment of the present invention described above, the case where the motor temperature decreases is exemplified, but the same effect can be obtained even when the motor temperature rises.

In the drawings, the same reference numerals indicate the same or corresponding parts.

In the present invention, the embodiment can be appropriately modified within the scope of the invention.

REFERENCE SIGNS LIST

1: Engine,
2: Generator,
3: Clutch,
4: Motor,
5: Tire,
6: Inverter,
7: Battery,
201: Inverter device,
203: Upper arm,
204: Lower arm,
205: U-phase switching circuit,
206: V-phase switching circuit,
207: V-phase switching circuit,
205H, 206H, 207H: Upper arm side switching element,
205L, 206L, 207L: Lower arm side switching element,
209: Motor temperature sensor
210: Control section,
210M: Memory device,
210MT: Magnetic flux table,
301: Current detector,
302: Magnetic pole position detector,
303: Current command value generating section,
304: Current control system,
305: Two-phases/Three-phases conversion section,
306: PWM modulation section,
307: Coordinate conversion section (Two-phases/Three-phases conversion section),
308: automatic weakening control calculation section,
3081: Magnet magnetic flux calculation section,
3082: Current combination candidate calculation section,
3083: Conventional automatic weakening flux control operation section,
3084: d-q axis current search section,
309: Inverter control circuit.

The invention claimed is:

1. A motor control device for controlling a motor in a vehicle having an inverter including arms of a plurality of phases having a plurality of switching elements and the motor of a plurality of phases driven by the inverter, comprising:
    a motor temperature sensor for detecting a magnet temperature of the motor,
    a magnet magnetic flux calculator that calculates a magnet magnetic flux of the motor corresponding to the magnet temperature of the motor,
    a current combination candidate calculator that calculates a d-q axis current combination candidate that minimizes an input current of the inverter within a voltage limit ellipse determined by a value that is output by a voltage of a power supply of the motor, and a d-q axis current searcher that searches the d-q axis current that minimizes the input current of the inverter within a range of the combination candidate of the d-q axis currents when the d-q axis current of the motor moves on a voltage limiting ellipse by automatic weakening flux control and outputs the searched d-q axis current to the motor;
    wherein the d-q axis current searcher compares the center of the voltage limit ellipse with the d-axis current command value when the d-q axis current is on the voltage limit ellipse, when the center of the voltage limiting ellipse is large, in the d-q-axis current combination candidate, the d-q axis current command value is in the positive direction, when the center of the voltage limit ellipse is small, the d-axis current is changed in the negative direction.

2. The motor control device according to claim 1, wherein the current combination candidate calculator of the d-q axis current acquires the magnet magnetic flux of the motor from an output of the motor temperature sensor and an output of the magnet magnetic flux calculator, estimates a torque of the motor from the d-q axis current of the motor and the magnet flux of the motor, and calculates a combination candidate of the d-q axis current so that the torque of the motor becomes the estimated torque.

3. The motor control device according to claim 1, wherein the magnetic flux calculator provides a magnetic flux table of the motor which receives the magnet temperature of the motor as an input, and wherein the magnet magnetic flux of the motor is obtained from the magnet temperature of the motor and the magnet magnetic flux map of the motor.

4. The motor control device according to claim 1, wherein the input current of the inverter is a value estimated from at least one of the values of a phase current of the motor, a 3 phase voltage command value, and the power-supply voltage.

5. The motor control device according to claim 1, wherein a magnet temperature of the motor is a value estimated from at least one of the values of the magnet temperature of the motor detected, a current output to the motor, and a voltage applied to the motor.

* * * * *